US007908583B2

(12) United States Patent
Sengupta et al.

(10) Patent No.: US 7,908,583 B2
(45) Date of Patent: Mar. 15, 2011

(54) EVIDENTIARY ENRICHMENT OF TRACEABILITY LINKS BETWEEN SOFTWARE SPECIFICATION REQUIREMENTS

(75) Inventors: Bikram Sengupta, New Delhi (IN); Vibha S Sinha, New Delhi (IN); Satish Chandra, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1476 days.

(21) Appl. No.: 11/321,673

(22) Filed: Dec. 29, 2005

(65) Prior Publication Data
US 2007/0162522 A1 Jul. 12, 2007

(51) Int. Cl.
*G06F 9/44* (2006.01)
(52) U.S. Cl. .................. 717/101; 717/120; 717/128
(58) Field of Classification Search ............ 717/128, 717/101, 120
See application file for complete search history.

(56) References Cited

U.S. PATENT DOCUMENTS

| | | | | |
|---|---|---|---|---|
| 5,862,318 | A | | 1/1999 | Habben |
| 5,898,836 | A | * | 4/1999 | Freivald et al. ............ 709/218 |
| 5,949,999 | A | * | 9/1999 | Song et al. ............... 717/127 |
| 6,408,312 | B1 | | 6/2002 | Forthman et al. |
| 6,591,259 | B1 | | 7/2003 | Sholars |
| 6,714,943 | B1 | | 3/2004 | Ganesh et al. |
| 6,728,719 | B1 | | 4/2004 | Ganesh et al. |
| 7,418,661 | B2 | * | 8/2008 | Brandenberger ............ 715/255 |
| 7,555,752 | B2 | * | 6/2009 | de Groot et al. ............ 717/170 |
| 2005/0033777 | A1 | | 2/2005 | Moraes et al. |
| 2005/0131964 | A1 | | 6/2005 | Saxena |
| 2005/0144198 | A1 | | 6/2005 | Bergstraesser et al. |
| 2007/0168921 | A1 | * | 7/2007 | Bailleul et al. ............. 717/104 |

OTHER PUBLICATIONS

Wiegers (Automating Requirements Management, Software Development, Jul. 1999).*
Costello et al. (Metrics for Requirements Engineering, Journal of Systems Software, 1995, issue 29, p. 39-63).*
Huang et al. (Event-Based Traceability for Managing Evolutionary Change, IEEE Transaction on Software Engineering, 2003, vol. 29, No. 9).*
INCOSE (Technology Builders, Inc. Response to INCOSE Survey, 2004, URL:http://www.incose.org/productspubs/products/setools/survey/caliber_rm.html, retrieved Jul. 8, 2010).*
Wiegers, Automating Requirements Management, Software Development, 1999.
Borland CaliberRM, www.Borland.com, copyright 2004.
Haumer et al, Improving Reviews of Conceptual Models by Extended Traceability to Captured System Usage, CREWS Rep. 99-16, Interacting with Computers, 1999, & Procs HICSS, 1999.

* cited by examiner

*Primary Examiner* — Lewis A Bullock, Jr.
*Assistant Examiner* — Hang Pan
(74) *Attorney, Agent, or Firm* — Jeffrey T. Holman

(57) ABSTRACT

Traceability links between software specification requirements are evidentially enriched. A traceability link indicates that a second specification requirement is dependent to some degree on a first specification requirement. A likelihood that the second specification requirement for software changes due to the first specification requirement for the software changing, and/or a degree of change of the second specification requirement due to the first specification requirement changing, are determined. A coupling value for the traceability link may be determined as directly proportional to the likelihood that the second specification requirement changes due to the first specification requirement changing, and to the degree of change of the second specification requirement due to the first specification requirement changing.

17 Claims, 3 Drawing Sheets

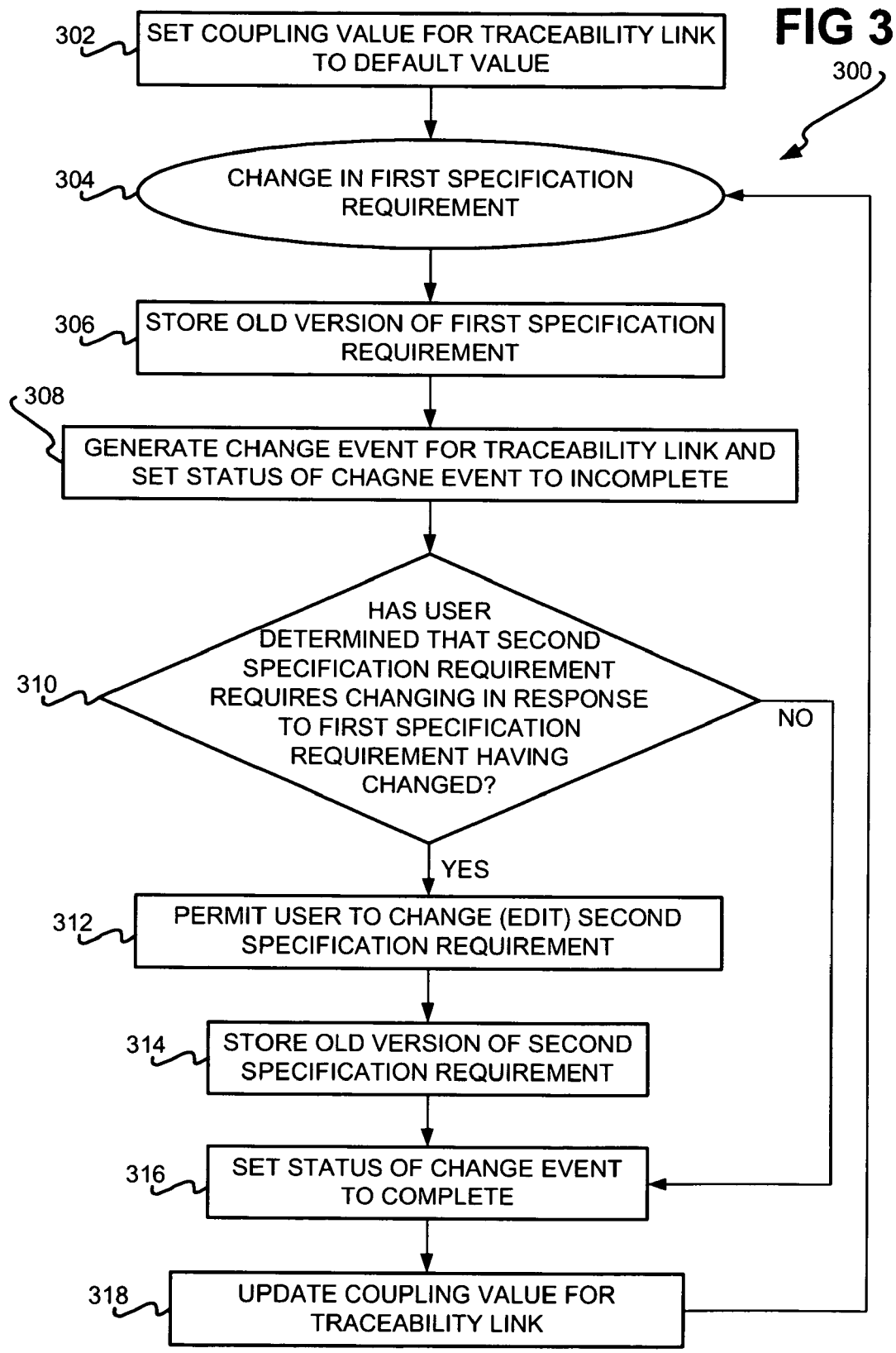

EVIDENTIARY ENRICHMENT OF TRACEABILITY LINKS BETWEEN SOFTWARE SPECIFICATION REQUIREMENTS

FIELD OF THE INVENTION

The present invention relates to specification requirements for software, where a second specification requirement may, for instance, be dependent to some degree on a first specification requirement, and more particularly to enriching such traceability links between specification requirements based on the change history of the requirements.

BACKGROUND OF THE INVENTION

Modem software engineering practices generally require the utilization of specifications prior to and during the development of software. The specifications for software can be considered the blueprint for the design of the software. In general, the specifications include a number of requirements. Particularly and thoroughly delineating the requirements can ensure that the software will be developed in accordance with a customer's or an end user's expectations.

Good software engineering practices usually mandate that such software specification requirements be traceable. A traceability relationship is a directed inter-specification requirement link that allows users to follow the life of a requirement in a forward and or backward direction. The primary goal of traceability is to ensure that the software satisfies all the specified requirements. More particularly, a traceability relationship, or link, indicates that a second specification requirement is dependent to some degree on a first specification requirement. If the first requirement changes, then there is thus a possibility that the second requirement may also need to change.

However, traceability links by themselves have very little semantic information, limiting their potential usefulness. For instance, while a given link shows the existence of a relationship between two requirements, it does not convey any information about the degree of "coupling" between the requirements. For example, a given requirement R1 may trace via a first link to a requirement R2 and via a second link to a requirement R3. However, the requirement R2 may be more sensitive to changes in the requirement R1 than the requirement R3 is. The traceability links between requirements R1 and R2 and between requirements R1 and R3 do not capture this coupling information, however.

Existing software specification requirements management tools include the Rational® RequisitePro® requirements management tool, available from International Business Machines, Inc., of Armonk, N.Y., and the DOORS® requirements management tool, available from Telelogic AB, of Malmö, Sweden. These management tools allow users to create traceability links among software specification requirements. However, they provide little if any support for tracking coupling information for the traceability links in a manner as described in the previous paragraph.

For example, within the RequisitePro® requirements management tool, when a given requirement changes, any other requirements that are linked to this requirement are marked as suspect to denote that they may be influenced by the change. However, there is no way by which the degree of this influence can be estimated. Furthermore, a user cannot manually assign coupling values to the traceability links in question that have been affected.

By comparison, within the DOORS® requirements management tool, a user is permitted to manually assign coupling values to traceability links. However, manual assignment of such values to traceability links is unsatisfactory for at least two reasons. First, such manual assignment is impractical at best, and impossible at worst, when there are literally thousands of specification requirements and traceability links, which is common for large software. Second, it is unclear on what basis developers should assign such coupling values and how they can update these values as requirements change. Furthermore, different developers may assign different values to the same traceability links, such that there is no objective measure as to what a particular coupling value represents or means as to a given traceability link.

For these and other reasons, therefore, there is a need for the present invention.

SUMMARY OF THE INVENTION

The present invention relates to evidentiary enrichment of traceability links between software specification requirements. A traceability link indicates that a second specification requirement is dependent to some degree on a first specification requirement. A method of one embodiment of the invention evidentially determines a likelihood that the second specification requirement for software changes due to a the first specification requirement for the software changing, and/or a degree of change of the second specification requirement due to the first specification requirement changing. The method further can output the likelihood that the second specification requirement changes due to the first specification requirement changing, and/or the degree of change of the second specification requirement due to the first specification requirement changing. Furthermore, a coupling value for the traceability link may be determined by the method as directly proportional to the likelihood that the second specification requirement changes due to the first specification requirement changing, and to the degree of change of the second specification requirement due to the first specification requirement changing.

A method of another embodiment of the invention performs the following. In response to a first specification requirement for software changing from an old version thereof to a new version thereof, a user may determine that a second specification requirement for the software that is dependent to some degree on the first specification requirement changing requires changing. In response, the user is permitted to edit the second specification requirement, from an old version thereof to a new version thereof. A coupling value for a traceability link indicating that the second specification requirement is dependent to some degree on the first specification requirement is updated based on at least one of the following. First, a likelihood that the second requirement changes due to the first specification requirement changing is evidentially updated. Second, a degree of change of the second specification requirement due to the first specification requirement changing is evidentially updated.

An article of manufacture of an embodiment of the invention includes a tangible computer-readable medium, such as a recordable data storage medium, and a means in the medium, such as a computer program. The means is for updating a coupling value for a traceability link indicating that a second specification requirement for software is dependent to some degree on a first specification for the software, based on at least one of the following. First, the coupling value can be updated based on a likelihood that the second requirement changes due to the first specification requirement changing, as determined in an evidentiary manner. Second, the coupling value can be updated based on a degree of change of the second specification requirement due to the first specification requirement changing, as also determined in an evidentiary manner.

Embodiments of the invention provide for advantages over the prior art. In contradistinction to the prior art, coupling values for traceability links between software specification requirements are determined in an objective manner, by using the change history of the requirements. Thus, the coupling values are determined in an evidentiary manner. A given traceability link between two requirements may have its coupling value updated based on the likelihood that the second requirement changes due to the first requirement changing, as mathematically determined, and/or based on the degree of change of the second requirement due to the first requirement changing, as also mathematically determined.

Therefore, a developer can easily view the "weightedness" of the traceability links, such as how strongly a given specification requirement influences another specification requirement, by virtue of analyzing the coupling values of the traceability links. The developer does not have to assign the coupling values manually, as they are automatically determined based on the change history of the requirements. Furthermore, since the coupling values are determined in an objective and evidentiary manner, they are not subjective, such that the same coupling value is determined for a given traceability link regardless of which developer has made a change to a specification requirement of the traceability link.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of another method, according to another embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
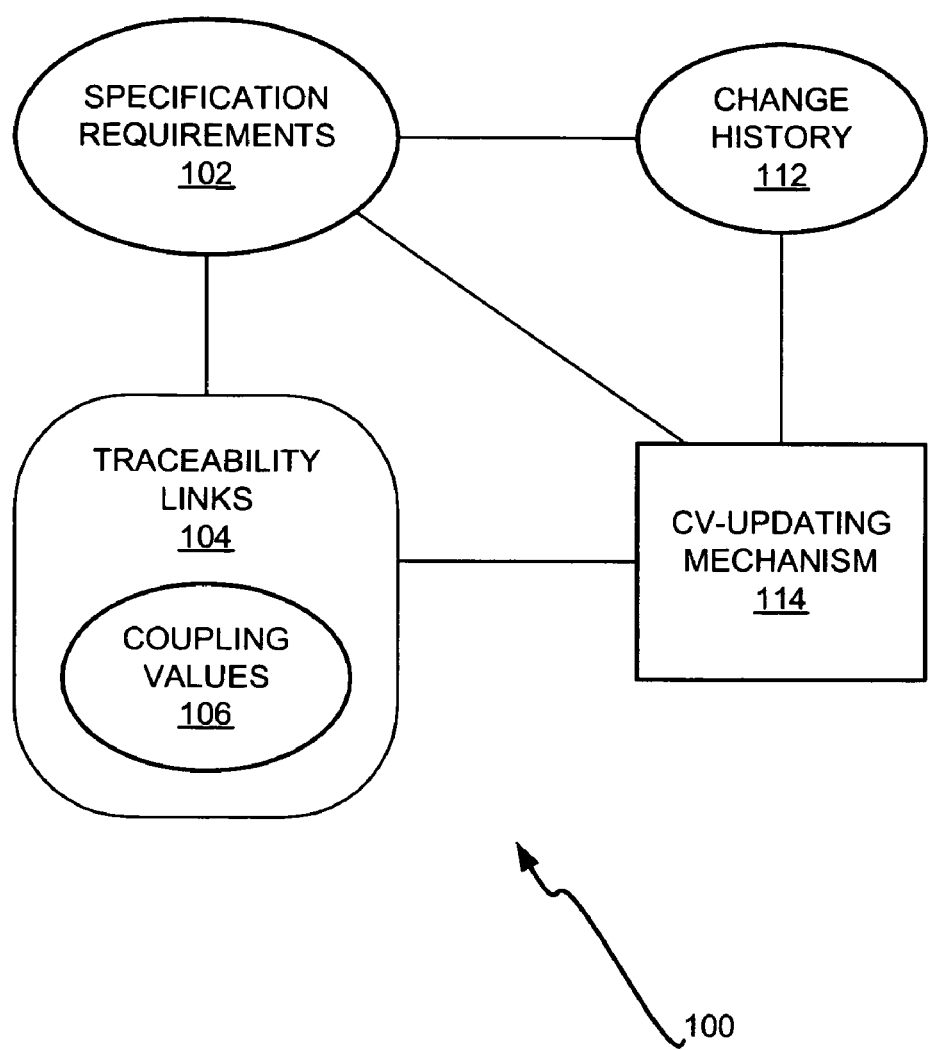
FIG. 1 is a diagram of a computerized system, according to an embodiment of the invention.

FIG. 1 shows a computerized system 100, according to an embodiment of the invention. The system 100 may be implemented over one or more computing devices, as can be appreciated by those of ordinary skill within the art. As can also be appreciated by those of ordinary skill within the art, the system 100 may have other components and/or store other data, in addition to and/or in lieu of those depicted in FIG. 1. The system 100 may be implemented in relation to a software development tool, such as a software specifications requirements management tool.

The system 100 includes one or more computer-readable media that store specification requirements 102, traceability links 104 for the specification requirements 102, and a change history 112 of the specification requirements 102. The specification requirements 102 are the requirements of the specifications for software that is being developed through use of the system 100. For example, a given specification requirement may indicate that customer data is to be stored such that it includes a two-letter country code for each customer. Another specification requirement may be linked to this requirement, and indicate that when customer data is displayed, two positions of the display should be taken up by the two-letter country code of a customer.

The traceability links 104 are directed inter-specification requirement links. Each of the links 104 indicates a relationship that a second specification requirement of the requirements 102 is dependent on a first specification requirement of the requirements 102 to some degree. For example, with respect to the two example specification requirements noted in the previous paragraph, the second requirement may be dependent on the first requirement. That is, for instance, if the first requirement regarding how the country of a customer is stored changes, then the second requirement regarding how the country of a customer is displayed also may need to be changed. Therefore, there would be a traceability link of the links 104 for and representing this relationship.

The traceability links 104 include a number of coupling values 106, where there is a coupling value for each traceability link. The coupling value generally specifies the relatedness or "weightedness" of a first requirement of a link and a second requirement of the link. For instance, as is described in more detail later in the detailed description, the coupling value for a traceability link can be based on, such as being directly proportional to, the likelihood that the second requirement of the link changes due to the first requirement of the link changing, as well as the degree of change of the second requirement due to the first requirement changing. The coupling values 106 within embodiments of the invention are objectively and automatically determined without subjective input by the user, in an evidentiary manner, as is described in more detail later in the detailed description.

The change history 112 is a database storing all the changes that have been made to the specification requirements 102. In one embodiment, each version of each specification requirement of the requirements 102 is stored in the change history 112. For example, for a given requirement RI, there may be versions $R1_0, R1_1, \ldots, R1_n$, where the initial requirement R1 is the version $R1_0$ and there have been n changes to the requirement R1, resulting in n versions $R1_x$, where $x=1, \ldots, n$. In another embodiment, the changes between versions of each specification requirement is stored, such that a given version of a requirement can be obtained by simply making all the changes from the original version of the requirement to the change representing the given version in question.

The coupling value-updating mechanism 114 updates the coupling values 106 of the traceability links 104 based on changes to the specification requirements 102 as captured by the change history 112. When a change to any of the specification requirements in 102 results, this change is captured in the change history 112. Furthermore, the user may be permitted to change any other of the specification requirements 102 that depend on the selected requirement, as denoted by the traceability links 104. Once these changes have been made, and captured within the change history 112, the mechanism 114 updates the coupling values 106 for the affected links of the traceability links 104. This process is described in more detail later in the detailed description. The mechanism 114 may be implemented in software, hardware, or a combination of software and hardware.

Figure 2:
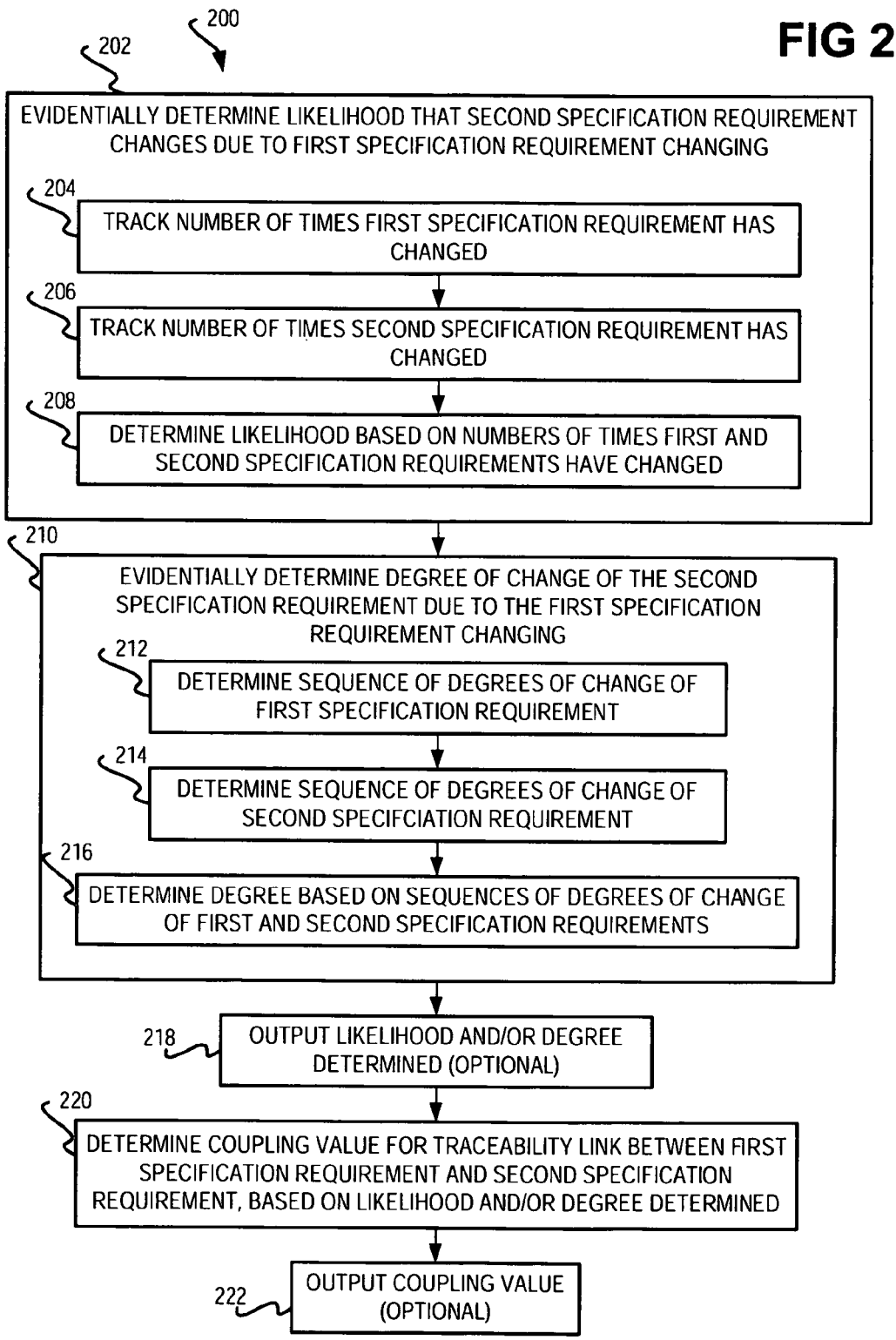
FIG. 2 is a flowchart of a method, according to an embodiment of the invention, and is suggested for printing on the first page of the patent.

FIG. 2 shows a method 200, according to an embodiment of the invention. The method 200 may be performed in relation to the system 100 that has been described. For example, the method 200 may be performed by the coupling value-updating mechanism 114 of the system 100, and/or by another part of the system 100. The method 200 is particularly described in relation to a given traceability link. This given traceability link indicates that a second specification requirement for software is dependent to some degree on a first specification requirement for the software.

First, the likelihood that the second specification requirement changes due to the first specification requirement changing is evidentially determined (202). This likelihood is evidentially determined in that it is objectively determined, without subjective input by the user, and based on, for instance, the change history of the first and the second specification requirements. In one embodiment, part 202 of the method 200 is performed by performing parts 204, 206, and 208.

First, the number of times that the first specification requirement has changed is tracked (204). Tracking may be accomplished in relation to the change history 112, and may be determined by the mechanism 114 by consulting the change history 112. Similarly, the number of times that the second specification requirement has changed due to a change in the first specification requirement is also tracked (206). The likelihood that the second specification requirement changes due to the first specification requirement changing is then determined based on these two numbers of times (208), in a way such that the likelihood is directly proportional to the number of times that the second specification requirement has changed due to a change in the first specification requirement. For example, the likelihood that the second requirement changes due to the first requirement changing may be determined as the number of times that the second requirement has changed due to a change in the first specification requirement, divided by the number of times that the first requirement has changed.

Next, the degree of change of the second specification requirement due to the first specification requirement changing is evidentially determined (210). This degree is evidentially determined in that it is objectively determined, without subjective input by the user, and based on, for instance, analysis of the change history of the first and the second specification requirements. In one embodiment, part 210 of the method 200 is performed by performing parts 212, 214, and 216.

First, however, it is presumed that there is a function $f(v1, v2)$ that measures or yields the degree of change in a given specification requirement between two versions thereof, v1 and v2, as can be appreciated by those of ordinary skill within the art. Depending on how specification requirements are represented, for instance, there may be several ways to delineate this function. For example, if a requirement is presented in a structured form, then the function may be based on the number of structural elements that changed between the two versions thereof. As another example, if a requirement can be traced to one or more source code files, then the function may be based on the number of lines of the source code that changed between two versions thereof.

As a final example, if a requirement is presented in a textual form, there are existing techniques that measure similarity between two versions thereof, and the function can be inversely proportional to this similarity. For instance, there are some such existing techniques to measure similarity between two versions of a textually represented requirement. One such existing technique is described in James Hayes et a., "Improving Requirements Tracing via Information Retrieval," in Proceedings of the Eleventh International Requirements Engineering Conference, pp. 151-161, September 2003, Monterey Bay, Calif.

Therefore, first, a sequence of the degrees of change of the first specification requirement is determined (212). This is the sequence $(C_{11}, C_{12}, \ldots, C_{1n})$. $C_{1x}$ is the value of the function measuring the degree of change of the first specification requirement from a version x of the first specification requirement to a version x+1 of the first specification requirement, where successive versions of the first specification requirement result from changes in the first specification requirement. For example, using the function $f(v1, v2)$, the value $C_{11}$ is equal to $f(R1_1, R1_2)$, where $R1_1$ is the first version of the specification requirement, and $R1_2$ is the second version of the requirement immediately following the first version, where a given change resulted in changing of the first version to yield the second version.

Similarly, a sequence of the degrees of change of the second specification requirement caused by a change in the first specification requirement, is also determined (214). This is the sequence $(C_{21}, C_{22}, \ldots, C_{2n})$. $C_{2x}$, is a value of a function measuring the degree of change of the second specification requirement from a version x of the second specification requirement to a version x+1 of the second specification requirement, where successive versions of the second specification requirement result from changes in the second specification requirement. In both part 214 and part 212 of the method 200, the various versions of the first and second specification requirements may be retrieved by the mechanism 114 from the change history 112.

It is noted that the changes represented in the sequences determined in parts 212 and 214 only reflect those changes in the first specification requirement that resulted in changes to the second specification requirement. That is, changes in the first specification requirement that did not result in changes to the second specification requirement occurring are not represented or encompassed by theses sequences. Similarly, changes in the second specification requirement that did not result from changes to the first specification requirement having occurred are not represented or encompassed by these sequences. Similarly, changes determined in part 206 only reflect those changes in the second specification requirement that resulted from changes in the first specification requirement. Changes in the second specification requirement that did not result from changes to the first specification requirement having occurred are not encompassed.

Finally, the degree of change of the second specification requirement due to the first specification requirement changing is determined based on these two sequences of degrees that have been determined (216). In one embodiment, this degree of change is determined as $$\frac{\sum_{i=1}^{n} \frac{C_{2i}}{C_{1i}}}{n}.$$

In another embodiment, this degree of change is determined as $$\frac{\sum_{i=1}^{n} C_{2i}}{n}.$$

In general, however, the degree of change of the second requirement due to the first requirement changing may be directly proportional to $C_{2i}$ for any given i. Thus, for any change in the second requirement due to the change in the first requirement, it can be concluded that any resulting change in the second requirement is stronger, or greater, in proportion to this degree of change that has been determined.

In one embodiment, the likelihood determined in part 202 of the method 200 and the degree determined in part 210 of the method 200 may be output (218). The manner by which the likelihood and the degree are output is not limited by embodiments of the invention. For instance, such output may include storing these values on a computer-readable medium. As another example, such output may include displaying these values to a user on a display.

Next, the coupling value for the traceability link between the first and second specification requirements is determined, based on the likelihood and/or the degree that have been determined (220). The coupling value may be directly proportional to the likelihood and/or the degree that have been determined. Where the likelihood determined in part 202 is denoted as P and the degree determined in part 210 is denoted as D, the coupling value may be equal to, for instance, cPD, where c is an optional constant. Finally, the coupling value itself may be output (222), similar to the manner by which the likelihood and the degree were output in part 218 of the method 200.

FIG. 3 shows a method 300, according to another embodiment of the invention. The method 300 may also be performed in relation to the system 100 that has been described, such that it is performed by the coupling value-updating mechanism 114 of the system 100, and/or by another part of the system 100. The method 300 is particularly described in relation to a given traceability link. This given traceability link indicates that a second specification requirement for software is dependent to some degree on a first specification requirement for the software. The method 300 describes the approach that may be followed for continually updating the coupling value of a given traceability link in response to changes of the first and second specification requirements of the link, and may use the method 200 that has been described.

First, the coupling value for the traceability link in question is initially set to a default value (302). A change in the first specification requirement for the traceability link occurs (304). In response, the old version of the first specification requirement, prior to the change therein, is stored (306), such as in the change history 112. A change event may be generated for the traceability link indicating that a specification requirement thereof has been changed, where the status of this change event is initially set to incomplete (308).

The user may then be provided the opportunity to determine whether the second specification requirement of the traceability link requires changing, due to the first specification requirement of the link having changed. If the user determines that the second requirement does require changing (310), then the user is permitted to change the second specification requirement (312), such as by being able to edit the second requirement. In response to or after such editing, the old version of the second specification requirement is stored (314), such as in the change history 112.

Next, regardless of whether or not the user has determined that the second specification requirement of the traceability link requires changing due to the first specification requiring of the link having changed, the status of the change event previously generated is set to complete (316). The coupling value for the traceability link is also updated (318). For instance, such updating may be based on evidentially updating the likelihood that the second requirement changes due to the first requirement changing, and/or on evidentially updating the degree of change of the second requirement due to the first requirement changing. Thus, the coupling value for the link may be updated by performing at least parts 202, 210, and 220 of the method 200 that has been described. The method 300 then repeats each time the first requirement changes, at part 304.

It is noted that the evidential support of coupling becomes stronger as there are more data points within the change history of the specification requirements. In one embodiment, to ensure that only non-trivial changes within requirements are considered, a user may be permitted to manually indicate that a trivial change has occurred, so that a change event as noted above is not generated, and coupling values not updated based thereon. Alternatively, if two versions of a given specification requirement are markedly similar, resulting in a low value of the function $f(v1, v2)$, then the change may be not considered, and coupling values not updated based thereon. For instance, the value of this function may have to be greater than a certain threshold to denote a non-trivial change.

Furthermore, there are different approaches to denote that a given change in a second specification requirement is due to an earlier change in the first specification requirement. In one approach, a user may be permitted to manually link a change in the second requirement to a change event representing a change in the first requirement. Alternatively, a user may be permitted to manually unlink or delink a change in the second requirement from a change event representing a change in the first requirement. Other approaches may also be employed, as can be appreciated by those of ordinary skill within the art.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. A method comprising:
   storing, in a computer-readable memory, specification requirements of a software specification and change history for the specification requirements; and
   generating traceability links responsive to the change history, each traceability link indicating that for a first one of the specification requirements a second specification requirement is dependent upon the first specification requirement, and wherein generating each traceability link comprises:
   automatically performing evidentiary analysis of the change history; and
   automatically generating a coupling value for the traceability link based on the evidentiary analysis of the change history, the coupling value based on at least one of i) a likelihood of the second specification requirement changing responsive to a change of the first specification requirement or ii) a degree of change for the second specification requirement, wherein the degree of change is responsive to a change of the first specification requirement;
   wherein the change history includes a number of times that the first specification requirement has changed and a number of times that the second specification requirement has changed due to the first specification requirement changing, and wherein generating the coupling value for the traceability link comprises determining the likelihood based on a proportion of:
the times the second specification requirement has changed due to the first specification requirement changing; and
the number of times the first specification requirement has changed; and
storing the traceability links with the corresponding coupling values in the computer-readable memory.

2. The method of claim 1, wherein the coupling value is a quantitative value derived from the likelihood, the degree, and a constant.

3. The method of claim 1, wherein generating the coupling value for the traceability link includes:
determining a sequence ($C_{11}, C_{12}, \ldots, C_{1n}$), where $C_{1x}$ is a value of a function measuring the degree of change of the first specification requirement from a version x of the first specification requirement to a version x+1 of the first specification requirement, where successive versions of the first specification requirement result from changes in the first specification requirement; and,
determining a sequence ($C_{21}, C_{22}, \ldots, C_{2n}$), where $C_{2x}$ is a value of a function measuring the degree of change of the second specification requirement from a version x of the second specification requirement to a version x+1 of the second specification requirement, where successive versions of the second specification requirement result from changes in the second specification requirement.

4. The method of claim 3, wherein generating the coupling value for the traceability link further includes determining the degree of change of the second specification requirement due to the first specification requirement changing as directly proportion to $C_{2i}$, for any i.

5. The method of claim 3, wherein generating the coupling value for the traceability link further includes determining the degree of change of the second specification requirement due to the first specification requirement changing as $$\frac{\sum_{i=1}^{n} \frac{C_{2i}}{C_{1i}}}{n}.$$

6. The method of claim 1, wherein generating the coupling value for the traceability link includes:
determining a sequence ($C_{21}, C_{22}, \ldots, C_{2n}$), where $C_{2x}$ is a value of a function measuring the degree of change of the second specification requirement from a version x of the second specification requirement to a version x+1 of the second specification requirement, where successive versions of the second specification requirement result from changes in the second specification requirement; and
determining the degree of change of the second specification requirement due to the first specification requirement changing as $$\frac{\sum_{i=1}^{n} C_{2i}}{n}.$$

7. An apparatus comprising:
a computer-readable memory having stored therein specification requirements of a software specification and change history for the specification requirements;
a processor; and
a computer-readable memory having stored therein program instructions for execution by the processor, wherein the program instructions comprise:
instructions for generating traceability links and storing the traceability links in a computer-readable memory, wherein each traceability link is generated responsive to the change history, each traceability link indicating that for a first one of the specification requirements a second specification requirement is dependent upon the first specification requirement, and wherein generating each traceability link comprises:
automatically performing evidentiary analysis of the change history; and
automatically generating a coupling value for the traceability link based on the evidentiary analysis of the change history, the coupling value based on at least one of i) a likelihood of the second specification requirement changing responsive to a change of the first specification requirement or ii) a degree of change for the second specification requirement, wherein the degree of change is responsive to a change of the first specification requirement
wherein the change history includes a number of times that the first specification requirement has changed and a number of times that the second specification requirement has changed due to the first specification requirement changing, and wherein the instructions for generating the coupling value for the traceability link include:
instructions for determining the likelihood based on a proportion of:
the times the second specification requirement has changed due to the first specification requirement changing; and
the number of times the first specification requirement has changed.

8. The apparatus of claim 7, wherein the coupling value is a quantitative value derived from the likelihood, the degree, and a constant.

9. The apparatus of claim 7, wherein the instructions for generating the coupling value for the traceability link include:
instructions for determining a sequence ($C_{11}, C_{12}, \ldots, C_{1n}$), where $C_{1x}$ is a value of a function measuring the degree of change of the first specification requirement from a version x of the first specification requirement to a version x+1 of the first specification requirement, where successive versions of the first specification requirement result from changes in the first specification requirement; and instructions for determining a sequence ($C_{21}, C_{22}, \ldots, C_{2n}$), where $C_{2x}$ is a value of a function measuring the degree of change of the second specification requirement from a version x of the second specification requirement to a version x+1 of the second specification requirement, where successive versions of the second specification requirement result from changes in the second specification requirement.

10. The apparatus of claim 9, wherein the instructions for generating the coupling value for the traceability link further include instructions for determining the degree of change of the second specification, requirement due to the first specification requirement changing as directly proportion to $C_{2i}$, for any i.

11. The apparatus of claim 9, wherein the instructions for generating the coupling value for the traceability link further include instructions for determining the degree of change of the second specification requirement due to the first specification requirement changing as $$\frac{\sum_{i=1}^{n}\frac{C_{2i}}{C_{1i}}}{n}.$$

12. The apparatus of claim 7, wherein the instructions for generating the coupling value for the traceability link include:
instructions for determining a sequence ($C_{21}$, $C_{22}$, ..., $C_{2n}$), where $C_{2x}$, is a value of a function measuring the degree of change of the second specification requirement from a version x of the second specification requirement to a version x+1 of the second specification requirement, where successive versions of the second specification requirement result from changes in the second specification requirement; and
instructions for determining the degree of change of the second specification requirement due to the first specification requirement changing as $$\frac{\sum_{i=1}^{n}C_{2i}}{n}.$$

13. A computer program product residing on a computer readable memory having computer readable program code, the program code comprising:
instructions for generating traceability links and storing the traceability links in the computer-readable memory, wherein each traceability link is generated responsive to a change history, each traceability link indicating that for a first one of a number of specification requirements a second specification requirement is dependent upon the first specification requirement, and wherein generating each traceability link comprises:
automatically performing evidentiary analysis of the change history; and automatically generating a coupling value for the traceability link based on the evidentiary analysis of the change history, the coupling value based on at least one of i) a likelihood of the second specification requirement changing responsive to a change of the first specification requirement or ii) a degree of change for the second specification requirement, wherein the degree of change is responsive to a change of the first specification requirement
wherein the change history includes a number of times that the first specification requirement has changed and a number of times that the second specification requirement has changed due to the first specification requirement changing, and wherein the instructions for generating the coupling value for the traceability link comprise:
instructions for determining the likelihood based on a proportion of the times the second specification requirement has changed due to the first specification requirement changing relative to the number of times the first specification requirement has changed.

14. The computer program product of claim 13, wherein the instructions for generating the coupling value for the traceability link include:
instructions for determining a sequence ($C_{11}$, $C_{12}$, ..., $C_{1n}$), where $C_{1x}$ is a value of a function measuring the degree of change of the first specification requirement from a version x of the first specification requirement to a version x+1 of the first specification requirement, where successive versions of the first specification requirement result from changes in the first specification requirement; and
instructions for determining a sequence ($C_{21}$, $C_{22}$, ..., $C_{2n}$), where $C_{2x}$ is a value of a function measuring the degree of change of the second specification requirement from a version x of the second specification requirement to a version x+1 of the second specification requirement, where successive versions of the second specification requirement result from changes in the second specification requirement.

15. The computer program product of claim 14, wherein the instructions for generating the coupling value for the traceability link further include instructions for determining the degree of change of the second specification requirement due to the first specification requirement changing as directly proportion to $C_{2i}$, for any i.

16. The computer program product of claim 14, wherein the instructions for generating the coupling value for the traceability link further include instructions for determining the degree of change of the second specification requirement due to the first specification requirement changing as $$\frac{\sum_{i=1}^{n}\frac{C_{2i}}{C_{1i}}}{n}.$$

17. The computer program product of claim 13, wherein the instructions for generating the coupling value for the traceability link include:
instructions for determining a sequence ($C_{21}$, $C_{22}$, ..., $C_{2n}$), where $C_{2x}$ is a value of a function measuring the degree of change of the second specification requirement from a version x of the second specification requirement to a version x+1 of the second specification requirement, where successive versions of the second specification requirement result from changes in the second specification requirement; and
instructions for determining the degree of change of the second specification requirement due to the first specification requirement changing as $$\frac{\sum_{i=1}^{n}C_{2i}}{n}.$$

* * * * *